United States Patent [19]

Kawata

[11] Patent Number: 5,274,777
[45] Date of Patent: Dec. 28, 1993

[54] DIGITAL DATA PROCESSOR EXECUTING A CONDITIONAL INSTRUCTION WITHIN A SINGLE MACHINE CYCLE

[75] Inventor: Tetsuro Kawata, Kanagawa, Japan

[73] Assignee: Fuji Xerox Co., Ltd., Tokyo, Japan

[21] Appl. No.: 676,692

[22] Filed: Mar. 29, 1991

[30] Foreign Application Priority Data

Apr. 3, 1990 [JP] Japan ................... 2-88483

[51] Int. Cl.[5] ............ G06F 7/36; G06F 7/08
[52] U.S. Cl. .................. 395/375; 395/600;
364/DIG. 1; 364/222.9; 364/271.6; 364/271.8;
364/231.8; 364/962.3
[58] Field of Search .................. 395/600, 375

[56] References Cited

U.S. PATENT DOCUMENTS

| | | | |
|---|---|---|---|
| 3,685,024 | 8/1972 | O'Connor | 395/600 |
| 3,931,612 | 1/1976 | Stevens et al. | 395/600 |
| 4,210,961 | 7/1990 | Whitlow et al. | 395/600 |
| 4,890,220 | 12/1989 | Nakagawa et al. | 364/DIG. 1 |
| 5,079,736 | 1/1992 | Kitsuregawa et al. | 395/600 |
| 5,142,687 | 8/1992 | Lary | 395/600 |

OTHER PUBLICATIONS

M. Namjoo et al., "CMOS Gate Array Implementation of the SPARC Architecture" (Compcon, 1988 Proceedings, pp. 10-13).

D. A. Patterson, "Reduced Instruction Set Computers," Communications of the ACM, Jan. 1985, vol. 28, No. 1, pp. 8-21.

*Primary Examiner*—Eddie P. Chan
*Attorney, Agent, or Firm*—Finnegan, Henderson, Farabow, Garrett & Dunner

[57] ABSTRACT

In a digital data processor having a CPU, a condition instruction is fetched from memory to an instruction register. A first control circuit responds to source-codes to select the general registers having respective pieces of data to be compared. A first latch stores instruction data including a code for an operation to be performed by an arithmetic and logic unit (ALU) on the two pieces of data under the control of a second control circuit. A conditional code register stores a conditional code representing the result of the ALU operation, and a second latch stores selection criteria for destination registers specified by the instruction. A selection circuit operates under the control of a third control circuit to sort the ALU output data of a third control circuit to the specific destination register in accordance with the selection criteria and the condition code. The instruction execution is completed within a single CPU cycle.

4 Claims, 5 Drawing Sheets

DIGITAL DATA PROCESSOR EXECUTING A CONDITIONAL INSTRUCTION WITHIN A SINGLE MACHINE CYCLE

BACKGROUND OF THE INVENTION

The invention relates to a digital data processor including a central processing unit (CPU).

Sorting pieces into a predetermined order is one of the basic processes executed in a digital data processor such as a digital computer. The sorting requires an operation of comparing the magnitudes to two pieces of data and ordering or classifying the two pieces of data based on the comparison.

As discussed in "CMOS Gate Array Implementation of the SPARC Architecture" by M. Namjoo et. al. (COMPCON, 1988 Proceedings, pp. 10 to 13), a digital data processor includes: an instructions; register for reading instruction; a plurality of general registers for storing data; an operation means (ALU, or arithmetic and logic unit) for, not only performing operations on the data supplied from the general registers, but also for writing the operated data back thereto; and a central processing unit (CPU) having a set of instructions that allow a basic instruction to be executed within a single machine cycle. A digital data processor may further include a main storage unit and a bus for interfacing between the main storage unit and the CPU.

To sort two pieces of data by magnitude with the digital data processor thus constructed, a series of instructions such as shown in FIG. 4 are required. Steps 1 to 6 in FIG. 4 correspond to a single instruction executed by the CPU. Each step will be described.

(i) In step 1 the CPU executes a "comparison instruction" that performs a series of operations of reading the data of the general register A and the data of the general register B, causing the ALU to compare these data, and updating a condition code. In this step, if the data of the register B is equal to or larger than the data of the register A, the sign bit of a condition code is set to 1, while if the data of the register A is equal to or larger than the data of the register B, the sign bit is set to O.

(ii) In step 2 a "conditional branch instruction" is executed. The conditional branch instruction selects step 3 or 5 as a step to be executed next based on the sign bit of the conditional code which is either 1 or 0. If the sign bit is 1, i.e., the data of the register B is larger than the data of the register A, the CPU executes step 4 after step 3. Although a bit other than the sign bit may be used, the bit used for conditional judgment indicates that the data of the register A is larger than the data of the register B or vice versa.

(iii) In steps 3 and 4 a "move instruction" is executed. The move instruction moves both data of the registers A and B to the registers C and D, respectively. If the sign bit is 0, i.e., the data of the register B is equal to or smaller than the data of the register A, the CPU executes step 6 after step 5. In steps 5 and 6, a move instruction is executed to move the data of the registers A and B to the registers D and C, respectively. Accordingly, in either case, the data which is larger between the registers A and B is stored in the register D and the data which is smaller between the registers A and B is stored in the register C.

However, in sorting two pieces of data by magnitude following the above steps, the processing time is relatively long, which is a disadvantage.

More specifically, the processing time corresponds to a time for the CPU to execute four instructions. A conditional branch instruction is included in the four instructions. The conditional branch instruction requires a longer processing time than a single ordinary instruction in the processing of the digital data processor that executes one instruction within one machine cycle, thereby entailing a longer time than for executing four ordinary instructions. The reason is that when pipeline processing is applied to increase the operation speed, the execution of the conditional branch instruction causes pipeline disturbance by temporarily emptying a pipeline.

The pipeline disturbance will be described in more detail. FIG. 5 is a diagram showing a timing of pipeline processing performed by a digital computer. In FIG. 5, execution of a single instruction requires four cycles: a fetching cycle; a decoding cycle; an operation cycle; and an operation result writing cycle. However, instructions are executed with a delay of one machine cycle each, thereby allowing one instruction to be executed substantially within each machine cycle.

However, a branching address to be specified by the conditional branch instruction for loading a next instruction varies depending on the operation result of a last instruction. If an instruction 2 is a conditional branch instruction in FIG. 5, then a next instruction cannot be fetched before the completion of cycle 3 during which the operation cycle of instruction 1 is executed after the fetching cycle of instruction 2 has been completed. In other words, it is in cycle 4 that the next instruction 3 is permitted to be fetched. Thus, no instruction can be executed during the cycles for executing instruction 3. This implies that the conditional branch instruction requires a two-cycle execution time according to the operation timing shown in FIG. 5. As a result, the conditional branch instruction is "penalized" for the processing time that is longer than required by execution of a single ordinary instruction.

To eliminate the pipeline disturbance, a delayed conditional branch instruction has been discussed in "Reduced Instruction Set Computer" by D. A. Patterson (Communications of the ACM, Vol. 28, No. 1, 1985, pp. 8 to 21). However, this technique is not a solution to the time-consuming processing in that it disadvantageously requires an additional jump instruction.

Further, a processor disclosed in Japanese Patent Unexamined Publication No. 221036/1987 (Japanese Patent Application No. 9220/1987) attempts to suppress the pipeline disturbance by predicting the branching destination in a conditional branch instruction and reading a series of instructions following the execution of the conditional branch instruction. However, presence of unpredictable conditional branch instructions and prediction errors have led to overhead and required additional hardware.

A reduced instruction set computer (RISC) proposed in Japanese Patent Unexamined Publication No. 49843/1988 (Japanese Patent Application No. 119167/1987) has an object of improving the processing speed by increasing the number of register file ports and allowing concurrent execution of a plurality of operation units. However, such an operation arrangement provides no particular advantage in the sorting of two pieces of data by magnitude, because its concurrently processable data are so independent of each other that comparison of the two pieces of data in one operation unit does not provide data to control the processing of another operation unit. Thus, concurrent sorting cannot be achieved by such an operation arrangement.

SUMMARY OF THE INVENTION

An object of the invention is to overcome the above problems associated with rearranging data in sorting or the like.

To achieve the above object, the invention provides a digital data processor which includes: an instruction register for reading instructions; a plurality of general registers for storing data; operating means for operating the data supplied from the general registers and writing the operated data back to the general registers; means for generating a conditional code from an operation result of the operation means; a central processing unit having a set of instructions capable of executing a basic instruction within a single machine cycle; means for reading a piece of data from each of two general registers specified by an instruction; means for storing a piece of data, larger or smaller, selected from the two pieces of data to one general register specified by an instruction; and means for controlling an operation so that an instruction involving the reading of data by the reading means and the selective storage of data by the storage means is executed within the single machine cycle.

DETAILED DESCRIPTION OF THE PREFERRED EMBODIMENTS

A central processing unit (CPU) of a digital processor, which is an embodiment of the invention, will be described in detail with reference to the accompanying drawings.

Figure 1:
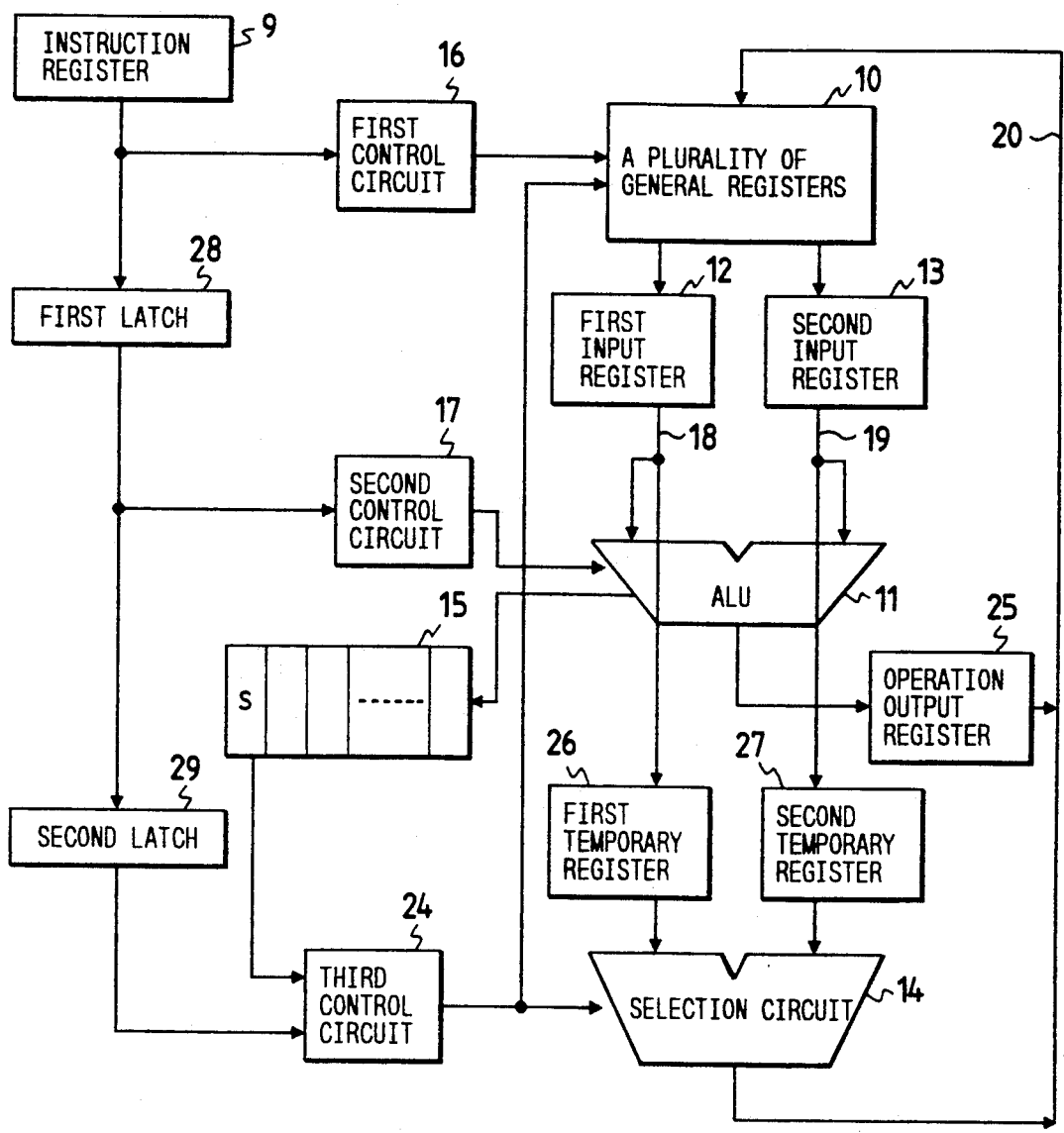
FIG. 1 is a block diagram showing an embodiment of the invention.

FIG. 1 is a block diagram showing a CPU according to the invention. In FIG. 1, an instruction register 9 is provided for storing instructions to be executed. A general register file 10 consists of a plurality of general registers. An ALU 11 performs operations on data. Additional system elements include first and second input registers 12 and 13, a selection circuit 14, a conditional code register 15, and first and second control circuits 16 and 17.

A first bus 18 is provided for reading a value from the general register file 10 through the first input register. A second bus 14 provides for reading a value from the general register file 10 through the second input register 13. A third bus 20 provides for writing a value back to the general register file 10. An operation output register 25 for stores and outputs an operation result of the ALU 11 to the bus. A first temporary register 26 stores a content of the bus 18. A second temporary register 27 stores content of the bus 19. A first latch 28 stores a content from the instruction register 9, a second latch 29 stores another content from the latch 28.

Figure 2A:
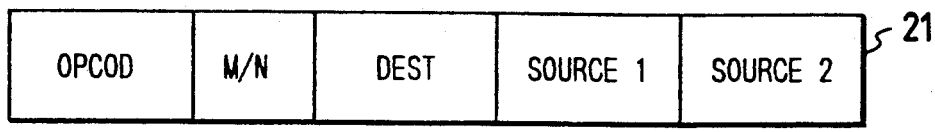
FIGS. 2(a) and 2(b) are diagrams showing a format of a sorting sub-instruction according to the invention.
Figure 2B:
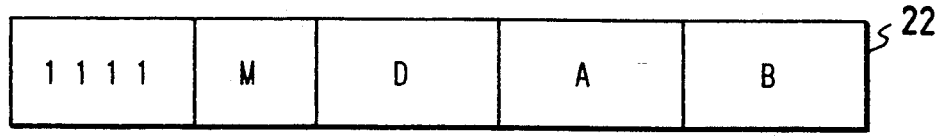

FIGS. 2(a) and 2(b) show a format of a sorting sub-instruction and a specific example thereof. FIG. 2(a) shows a format of a sorting sub-instruction. The sub-instruction is divided into five fields such as a sorting sub-instruction code field (OPCODE), a data comparison and selection field (N/N), a field for specifying a register to which the selected data is stored (DEST), a field for specifying a register whose content is read to the first bus (SOURCE1), and a field for specifying a register whose content is read to the second bus (SOURCE2), as shown from left to right. FIG. 2(b) shows a specific example of such sub-instruction. The instruction code for the sorting sub-instruction is 1111.

An example in which the CPU shown in FIG. 1 executes the sorting sub-instruction on a pipeline basis will be described next. Execution of a single instruction is completed by four cycles: fetching (reading the instruction), decoding (decoding the instruction), operating, and writing the operation result. The term "cycle" used herein is intended to mean a basic operation cycle in which various components shown in FIG. I operate in synchronism with one another.

(i) In the instruction fetching (reading) cycle, a sorting sub-instruction 22 is read to the instruction register 9. It is assumed that if the selection criteria is M/N =M (meaning that the larger data must be selected), data which is larger will be selected.

(ii) In the instruction decoding cycle, the contents of the SOURCE1 field and the SOURCE2 field of the sorting sub-instruction 22 are applied from the instruction register 9 to the first control circuit 16, and the contents of the registers specified by control signals of the first control circuit are stored in the first input register 12 and the second input register 13. In this example, the content of the register A and the content of the register B are read to the first input register and the second input register, respectively.

At the same time, the OPCODE field, M specified by the M/N field and the DEST field of the sorting sub-instruction 22 are latched by the first latch 28.

(iii) The operating cycle executes the following.

The OPCODE field of the sorting sub-instruction 22 is applied to the second control circuit 17 from the first latch 28. The control circuit 17 applies a signal to the ALU so that subtraction instructed by the sorting sub-instruction will be performed. The first input register 12 and the second input register 13 send their data to the first bus 18 and the second bus 19, respectively. The ALU receives the data from the first bus 18 and the second bus 19 and sets a conditional code obtained from its operation result to the conditional code register 15. The ALU subtracts the input data from the first and second buses for comparison and sets the sign bit of the conditional code ("S" indicated at the register 15 in FIG. 1) to O. This sign bit indicates that the result obtained by subtracting the content of the second bus from the content of the first bus is a positive value. In parallel therewith, the first temporary register 26 and the second temporary register 27 receive and store the content of the first bus and the content of the second bus, respectively. Further, M specified by the M/N field and the DEST field of the sorting sub-instruction 22 are latched at the second latch 29.

(iv) Lastly, in the fourth operation result writing cycle, the content of the second latch 29 is applied to the third control circuit 24. The third control circuit 24 prepares a control signal for the selection circuit 14 from the sign bit of the conditional code register 15 and the content the M/N field received from the second latch 29. Here, the selection signal is prepared on the basis of a rule indicated in Table 1. In Table 1, if the M/N field of the sub-instruction 22 is, e.g., M, which instructs that the larger data be selected, and if the sign bit indicates O, then the selection circuit 14 selects the content of the first temporary register 26 based on the value of a control signal applied from the third control circuit 24 and outputs the selected data.

TABLE 1

| M/N | S | 0 | 1 |
|---|---|---|---|
| M | | TR1 | TR2 |
| N | | TR2 | TR1 |

S: Sign bit of the conditional code register
M/N: M/N comparison and selection field shown in FIG. 2(a)
TR1: Indicates that the first temporary register 26 shown in FIG. 1 is selected.
TR2: Indicates that the second temporary register 27 shown in FIG. 1 is selected.

The selection circuit 14 applies the content of either the first temporary register 26 or the second temporary register 27 to the third bus 20 based on the control signal outputted from the third control circuit 24. Further, the third control circuit 24 sends a control signal to the general register file 10 based on the DEST field received from the second latch 29. The general register file 10 writes the data received from the third bus 20 to the register D for storing the result as specified by the sub-instruction 22 based on this control signal.

Figure 3:
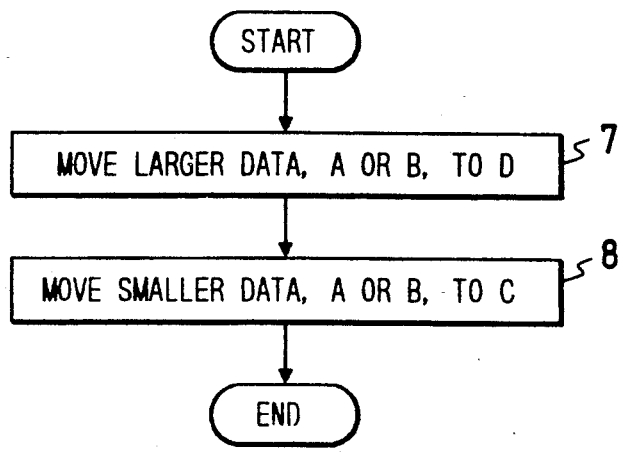
FIG. 3 is a flow chart for sorting two pieces of data by magnitude to which the invention is applied.

Accordingly, by reading the sorting sub-instruction in which M/N is sorted in the order of M and N, two pieces of data can be sorted by two instructions as shown in FIG. 3.

Figure 6:
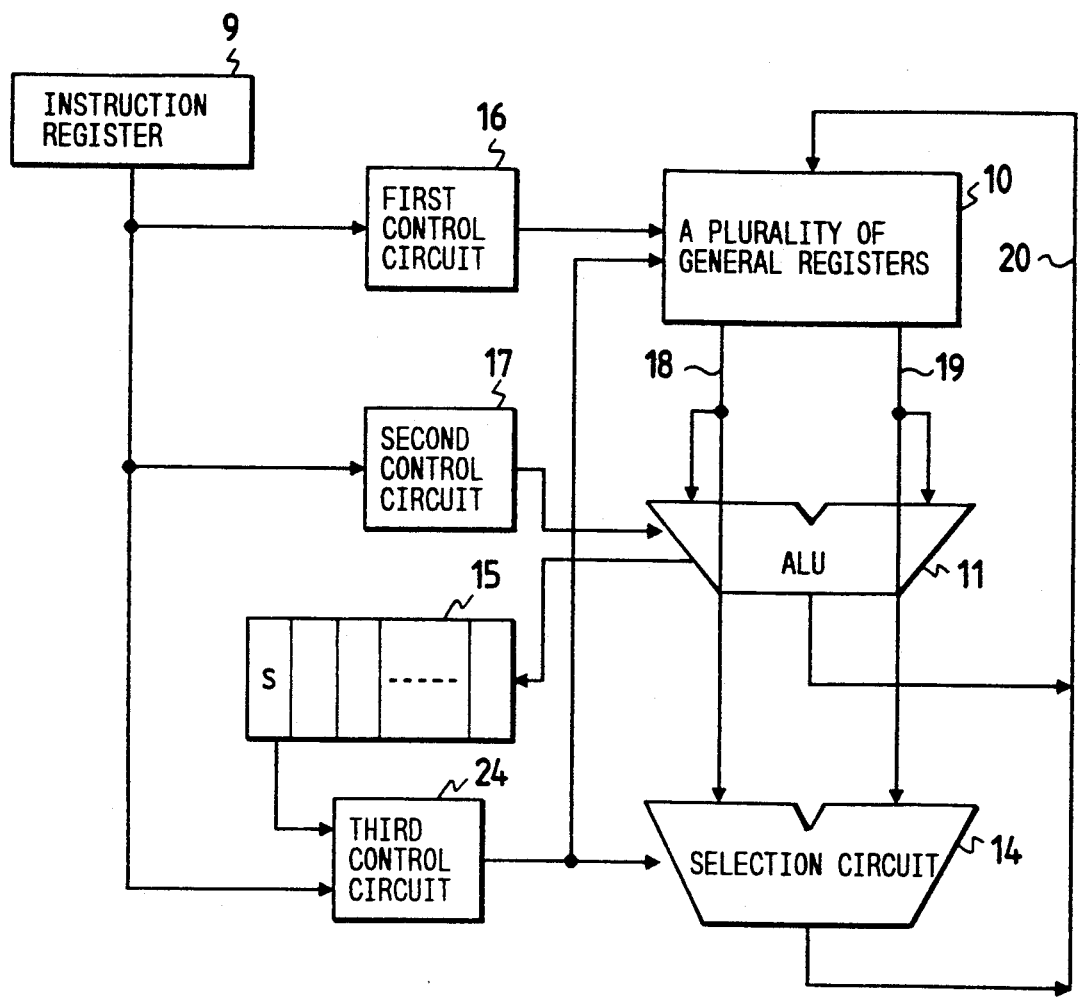
FIG. 6 is a block diagram showing an embodiment of the invention without using the pipeline processing.

The above construction and operation of this embodiment is directed to the case of pipeline processing. If no pipeline processing is performed, it goes without saying that the second input register, the first and second temporary registers, the first and second latches, and the operation output register shown in the block diagram of FIG. 1 are not necessary. An exemplary construction of such a case will be as shown in FIG. 6. Specifically, the fetching (reading) of an instruction to the instruction register 9, the decoding at the first to the third control circuits 16, 17, 24, the reading from general registers, the operation at the ALU, and the writing of the operation result back to a general register are executed within the same machine cycle.

Further, while the selection of the larger data is executed during the writing-back cycle in the construction applied to the pipeline processing shown in FIG. 1, such selection may be executed during the operation cycle. In such a case, the temporary registers are arranged at the output of the selection circuit.

Figure 4:
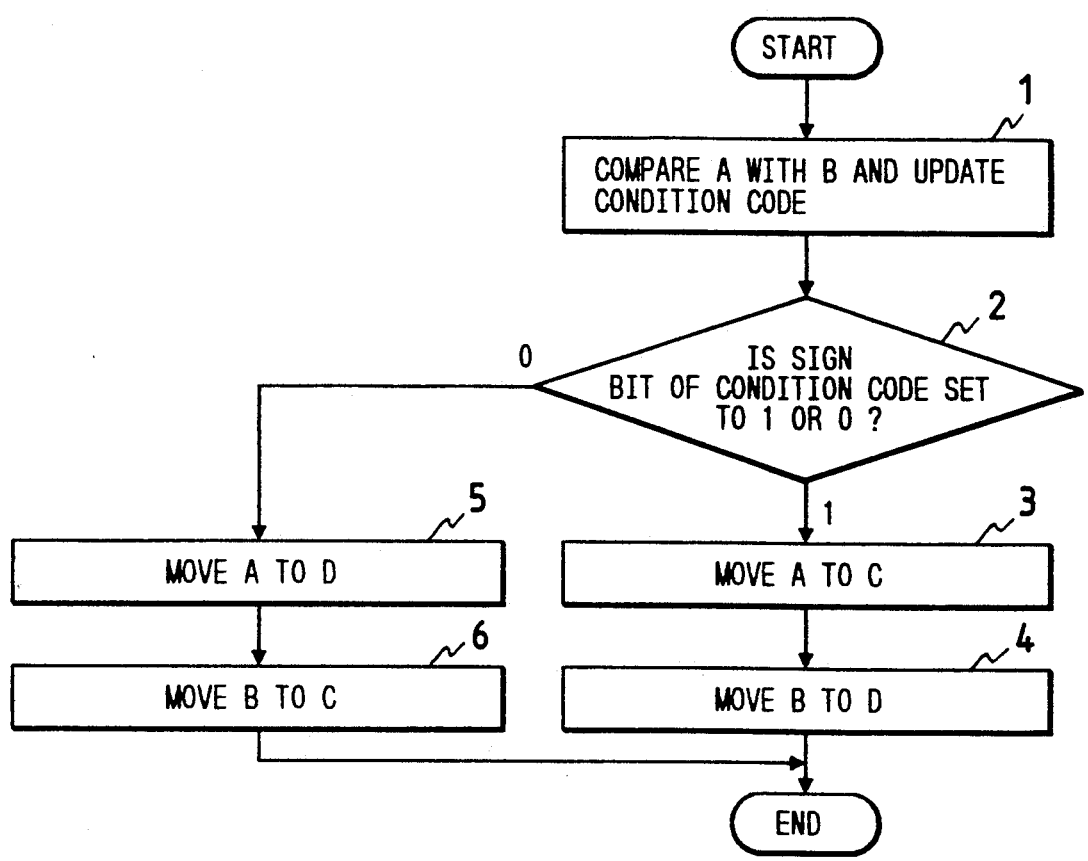
FIG. 4 is an exemplary conventional flow chart for sorting two pieces of data by magnitude.
Figure 5:
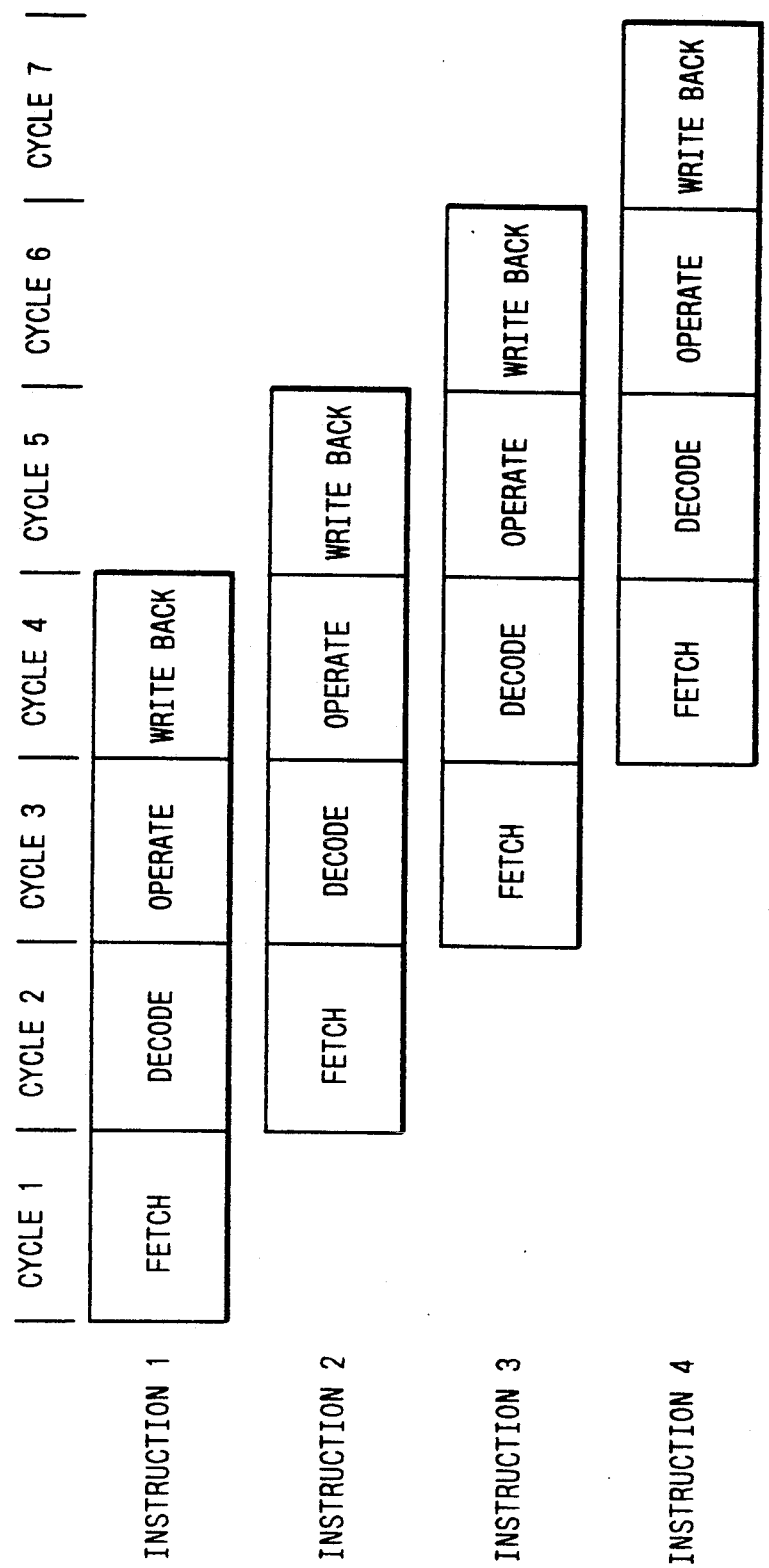
FIG. 5 is a diagram showing a timing of pipeline processing.

According to the invention, the sorting of two pieces of data which has heretofore been performed by the four instructions as shown in FIG. 4 can be completed by the two "sorting sub-instructions" 7, 8 as shown in FIG. 3, thereby permitting high-speed operations.

Further, the invention dispenses with the conventionally required conditional branch instruction, thereby allowing the pipeline processing to be performed without disturbance or processing time penalty, which ensures high-speed performance.

Furthermore, arrangement of two temporary registers for holding the two pieces of data read from the two general registers specified by the instruction provides a construction suitable particularly for pipeline processing.

What is claimed is:

1. A digital data processor having a central processing unit operating in response to a stored set of instructions, a basic instruction of said instructions being executed within a single machine cycle, said digital processor comprising:
    an instruction register for reading an instruction;
    a plurality of general registers for storing data;
    means for reading respective pieces of data from two of said plurality of general registers, said two general registers being specified by instruction;
    operation means for applying an operation specified by the instruction to said pieces of data supplied from said general registers;
    means for generating a conditional code from the operated data produced by said operation means;
    means for selecting one of said respective pieces of data from said operation means in accordance with the conditional code and in accordance with whether said one piece of data is larger or smaller than the other of said respective pieces of data as specified by the instruction, and for selecting a general register being specified by the instruction as a destination for the selected piece of data; and
    means for controlling said general registers, said operation means, said condition code generating means, said reading means, and said selecting means so that the instruction is executed within a single machine cycle.

2. A digital data processor according to claim 1, wherein said selecting means includes two temporary registers for storing said two pieces of data read from said two general registers specified by said instruction.

3. A digital data processor according to claim 2, wherein said controlling means includes a first latch for storing an operation code derived from said instruction register for said operation means, and said controlling means further includes a second latch for storing a first code specifying selection criteria for said selecting means and a second code specifying said one general register as the destination for said one selected piece of data.

4. A digital data processor according to claim 3, wherein said controlling means further includes a first control circuit responding to a third code in the instruction to select said two registers as source registers for said respective pieces of data.

* * * * *